United States Patent

Wepner

[11] 4,033,571
[45] July 5, 1977

[54] POSITIONING ARRANGEMENT

[75] Inventor: Joachim Wepner, Gevelsberg, Germany

[73] Assignee: Rolf Peddinghaus, Gevelsberg, Germany

[22] Filed: Dec. 16, 1975

[21] Appl. No.: 641,187

[30] Foreign Application Priority Data

Dec. 20, 1974 Germany .......................... 2460615

[52] U.S. Cl. ............................... 269/315; 269/207; 269/210
[51] Int. Cl.² .......................................... B23Q 7/00
[58] Field of Search .......... 269/315, 320, 234, 190, 269/207, 210, 20, 32

[56] References Cited

UNITED STATES PATENTS

| | | | |
|---|---|---|---|
| 1,867,922 | 7/1932 | Nelson | 269/315 |
| 2,989,337 | 6/1961 | Pispisa | 269/234 |

Primary Examiner—Al Lawrence Smith
Assistant Examiner—Robert C. Watson
Attorney, Agent, or Firm—Michael J. Striker

[57] ABSTRACT

A positioning arrangement for an element, such as an abutment of an industrial cutting machine, which is mounted on an elongated rail for movement longitudinally thereof, includes a toothed portion rigid with and extending longitudinally of the elongated rail, and an arresting member having serrations which are adapted to matingly engage with the toothed portion in a plurality of positions. The arresting member is mounted on the element for displacement toward and away from the toothed portion, and also for limited movement relative to the element longitudinally of the elongated rail. The arresting member has two opposite lateral surfaces which diverge toward the toothed portion, and a pair of wedge members is provided, each of the wedge members having a wedge surface adapted to contact the lateral surface of the arresting member, the wedge members being mounted on the element for independent displacement toward and away from the toothed portion. A spring urges the arresting member toward engagement with the toothed portion, and a pair of flanges extends into the path of movement of the wedge members away from the toothed portion, the force of engagement of the wedge members with the flanges overcoming the urging force of the spring and thus disengaging the arresting member from the toothed portion. When the element is to be arrested in any of an infinite number of positions along the elongated rail, the wedge members first disengage from the flanges of the arresting member so that the spring displaces the arresting member into one of a plurality of discrete positions relative to the toothed portion, and then the wedge surfaces of the wedge members individually engage the lateral surfaces of the arresting member, thus connecting the element to the arresting member and arresting the former in the selected position.

13 Claims, 6 Drawing Figures

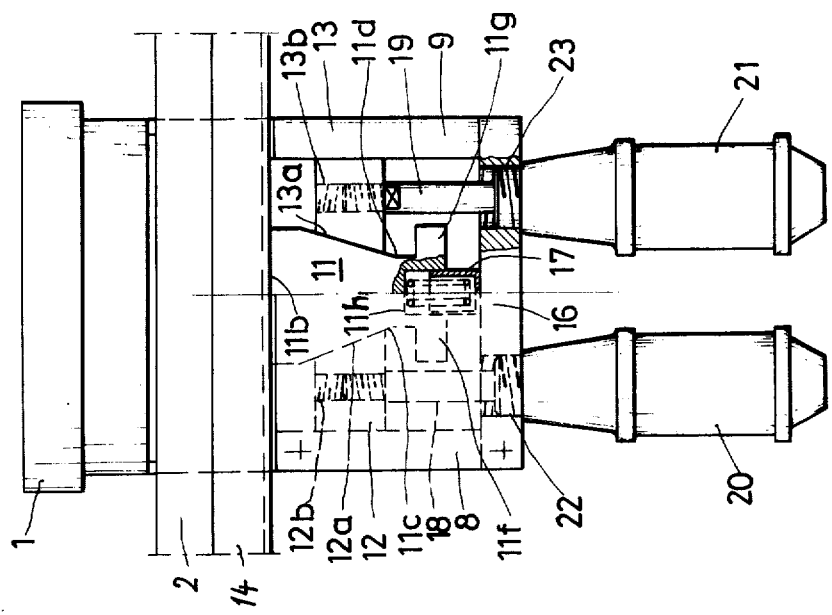
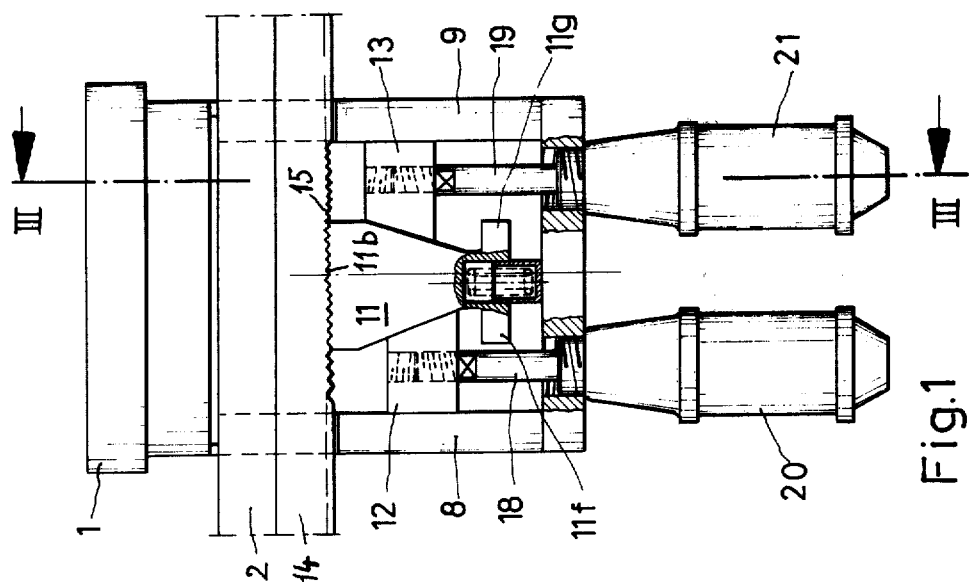

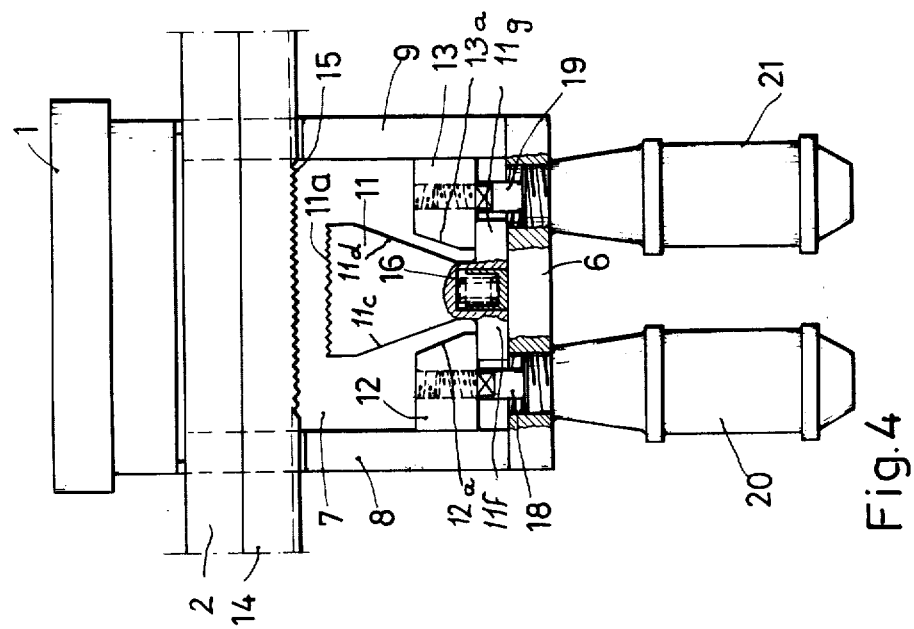
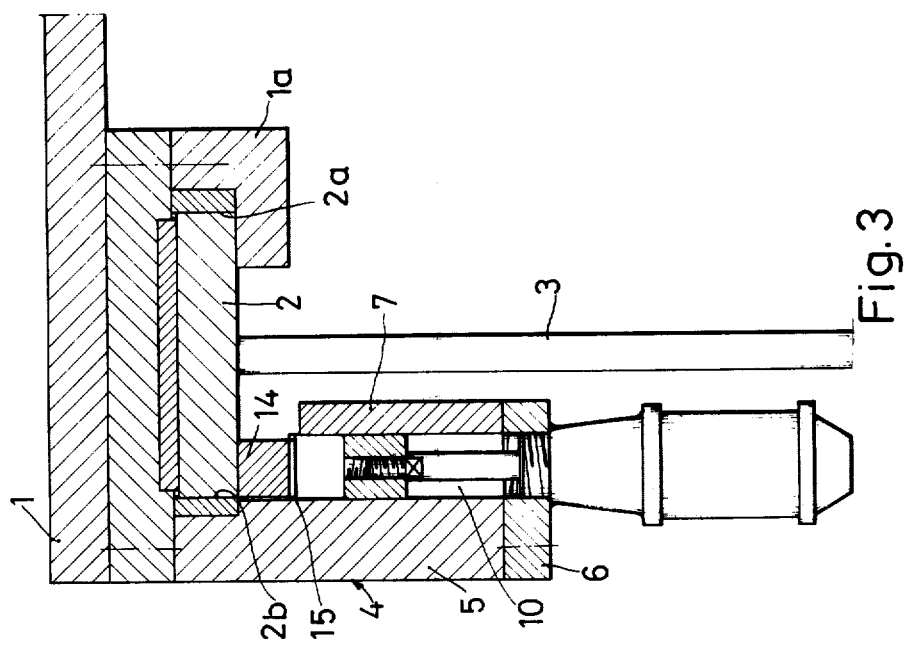

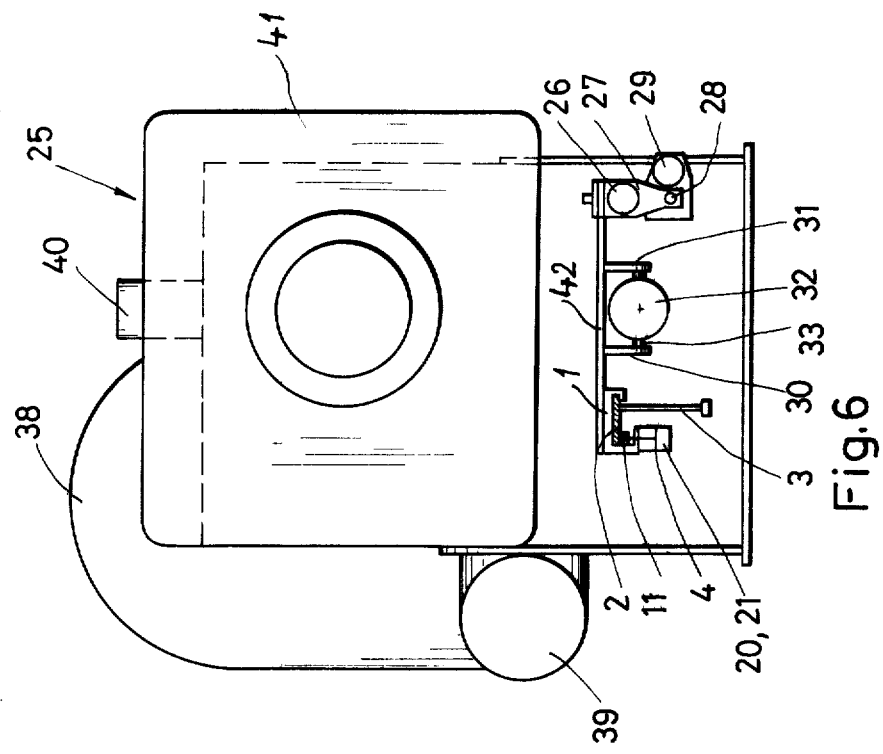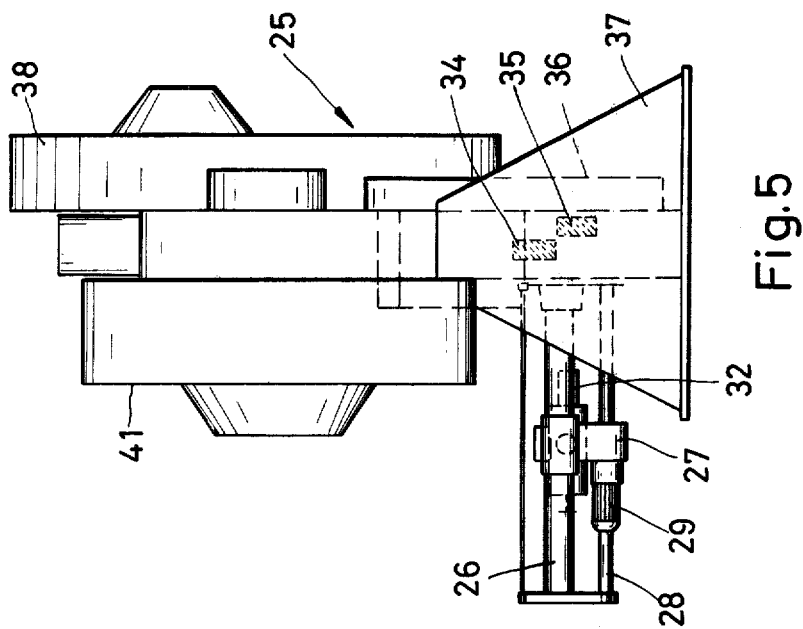

POSITIONING ARRANGEMENT

BACKGROUND OF THE INVENTION:

The present invention relates to a positioning arrangement in general, and more particularly to a positioning arrangement for use in a machine tool, such as a cutting or shearing machine.

There are already known various positioning arrangements which can be used for positioning a workpiece relative to a machine tool, such as cutting or shearing machine. Such an arrangement usually includes an abutment which is mounted on an abutment carriage for movement longitudinally of an elongated rail. An arresting device is provided which arrests the abutment carriage in a selected one of a plurality of positions along the elongated rail so that the abutment is located a predetermined distance downstream of the cutting or shearing blades of the machine. In the conventional arrangements, the arresting device either includes an arresting member which frictionally engages a portion of the elongated rail, or both the arresting member and the elongated rail are formed with serrated portions which engage with one another in a plurality of discrete positions of the abutment carriage relative to the elongated rail. It will be appreciated that, in the former event, the frictional engagement does not assure with absolute certainty tha the abutment carriage will remain in its selected position for an extended period of time needed for accomplishing a series of cutting operations, particularly when the abutment carried by the abutment carriage is subjected to substantial impacts. On the other hand, the construction of the arresting device with the cooperaing serrations, while preventing movement of the abutment carriage longitudinally of the rail due to the impact forces to which the abutment carriage often is subjected, does not permit arresting of the abutment carriage in any of an infinite number of positions longitudinally of the rail, but only permits arresting of the abutment carriage in a plurality of discrete positions.

The above problems are especially present, and the above considerations particularly valid, in shearing machines which are used for severing blanks from profiled elongated rods, which blanks are then to be used in forging, particularly in drop forging or swage or die forging operations. Under these circumstances, the other dimensions being given by the dimensions of other profiled elongated rods, the length of the severed-off blank determines the amount and weight of the material present in the blank. Inasmuch as the above-mentioned forging operations require that the weight of the blank be as accurate as possible, a deviation of 0.5 one way or the other being about the most that can be tolerated, it is necessary to adjust the position of the abutment relative to the shearing blades with the necessary accuracy. In such shearing machines, the abutment is located downstream of the shearing blades when considered in the direction of advancement of the elongated profiled bar or rod, the latter abutting against the abutment and thus being stopped in a predetermined position relative to the shearing blades. Since the elongated rod may have a mass of, for instance, 500 kilograms, and may abut the abutment with a speed of 0.5 meters per second, the arresting device must be so constructed as to assure that the abutment will not be displaced away from the shearing blades as a result of such impact, whether or not the latter are damped by pneumatic or hydraulic damping arrangements. To illustrate the degree of accuracy with which the positioning arrangement ought to be located and arrested with respect to the shearing blades, it is to be mentioned that, when the profiled elongated bar or rod is of a square cross-section of approximately 100 times 100 millimeters, and having a length of 100 millimeters, a length tolerance of approximately ±0.2 millimeters is acceptable as a rule, since under such circumstances the weight tolerance will be within acceptable limits.

It is also already knwon to utilize, in such arrangements, a manually operated clamping lever which exerts a pressing force on the elongated guide rail via a threaded spindle, but such an arrangement achieves less than satisfactory results, for the reasons mentioned above, in the arrangement of the type here under consideration, particularly as far as the exact positioning of the abutment carriage and the stability of the abutment carriage in a selected position are concerned.

SUMMARY OF THE INVENTION

Accordingly, it is a general object of the present invention to avoid the disadvantages of the prior-art arrangements.

More particularly, it is an object of the present invention to provide a positioning arrangement which is capable of being arrested in any of an infinite number of positions along a guide rail therefor.

It is a further object of the present invention to provide a positioning arrangement which is securely retained in a selected one of such positions regardless of the magnitude of impacts acting thereon.

It is still another object of the present invention to provide a positioning arrangement which is simple in construction and reliable in operation.

It is a concomitant object of the present invention to provide a positioning arrangement, the position of which can be easily changed when an arresting device thereof is disengaged, but which will be securely retained in place when the arresting device is engaged.

A still further object of the present invention is to provide a positioning arrangement which does not require a high degree of skill for the operation thereof.

In pursuance of these objects, and others which will become apparent hereafter, one feature of the present invention resides, briefly stated, in a positioning arrangement which comprises, in combination, elongated guide means; an element mounted on the guide means for movement in longitudinal direction thereof; and means for arresting the element in an infinite number of different positions along the guide means.

More particularly, the combination which constitutes the positioning arrangement is constructed with the arresting means including a toothed portion which is rigid with and extends longitudinally of the guide means, and an arresting member which has at least one detent projection extending towards the toothed portion. The arresting member is mounted on the element for displacement toward and away from the toothed portion so that the detent projection engages at least one selected tooth of the toothed portion to thereby arrest the arresting member in a selected discrete position relative to the guide means, and disengages therefrom, respectively, and for movement relative to the element in the longitudinal direction of the guide means. Furthermore, means is provided for so connecting the element with the arresting member, when the former is in a selected one of the different positions and the latter is in the selected discrete position, as to prevent any relative movement therebetween so that the arresting member arrests the element in the selected position thereof.

In a currently preferred embodiment of the present invention, the mounting means for the arresting member includes a hollow casing which is rigidly connected to the element, open toward the toothed portion, and in which the arresting member is accommodated. The arresting member has opposite lateral surfaces which diverge in direction normal to the toothed portion, and the connecting means includes a pair of wedge members which have respective wedge surfaces adapted to contact the lateral surfaces along the latter, the wedge members being mounted in the casing for displacement toward and away from contact with the lateral surfaces of the arresting member. The lateral surfaces diverge in a direction toward the toothed portion, and the wedge members are mounted for displacement toward and away from the toothed portion whereby the wedge surfaces contact the lateral surfaces during the displacement of the wedge members toward the toothed portion. Cylinder-and-piston units which are controlled by admitting pressurized medium thereinto are used for displacing the wedge members into and out of contact with the arresting member.

In view of the fact that the arresting member is mounted in the casing not only for movement toward and away from the toothed portion, but also longitudinally thereof, it is achieved that the element which is to be arrested in selected position, can be arrested not only in those discrete positions which are determined by the spacing of the toothed portion, but also in any number of intermediate positions so that the adjustment of the position of the element along the guide rail is, for all intents and purposes, stepless and the element can be arrested in an infinite number of different positions relative to the guide rail. On the other hand, the cooperation of the serrations of the toothed portion and of the arresting member, together with the cooperation of the wedge surfaces of the wedge members with the lateral surfaces of the arresting member, assure reliable arresting of the element to be arrested in a selected position. In this manner, once the position of the element along the guide rails is selected, the element can be arrested in such a selected position, and the cooperation of the serrations in arresting the arresting element, and the cooperation of the wedge members with the arresting member to arrest the element, assure that, short of shearing of the serrations, any number and magnitude of the inertial impacts acting on the element will not be able to dislocate or shift the element in the direction of action of the impact forces.

In a currently preferred embodiment of the present invention, the arresting member has flanges which extend laterally thereof at the end of the arresting member which is spaced from the toothed portion of the guide rail, such flanges extending into the path of movement of the respective wedge members on their way from the toothed portion. A biasing spring arrangement urges the arresting member toward engagement with the toothed portion, and the wedge members, when they come into contact with the flanges during the movement away from the toothed portion, exert forces which overcome the force exerted on the arresting member by the biasing spring arrangement and thus disengage the arresting member from the toothed portion. On the other hand, when the wedge members are displaced toward the tooth portion, the biasing spring arrangement presses the flanges against the wedge members until the arresting member engages the toothed portion which discontinues the displacement of the arresting member so that further movement of the wedge members toward contact of the wedge surfaces with the lateral surfaces of the arresting member results in an increasing spacing between the flanges and the wedge members. Thus, in the arresting position of the arresting member, the flanges are spaced both from the wedge members and from the casing in which the wedge members are accommodated, the latter being due to the action of the biasing spring arrangement. In this manner, it is assured not only that the wedge members entrain the arresting member during the movement away from the toothed portion and thus disengage the former from the latter, but also that the arresting member, in spite of its freedom of movement in two normal directions, is positively guided in the casing and securely arrested in the arresting position thereof. The fact that the flanges are spaced from the wedge members in the arresting position of the arresting member, and also spaced from the casing, brings about the necessary relative movability of the arresting member in a direction parallel to the guide rails, so that the serrations of the arresting member can engage between the serrations of the toothed portion even in such a situation when the element to be arrested is so situated with respect to the toothed portion that the tips of the serrations of the arresting member come into contact with the tip regions of the serrations of the toothed portion when the arresting member is in the central position thereof. It will be appreciated that the relative movement of the arresting member with respect to the toothed portion in direction longitudinally thereof permits sliding of the sloped portions of the serrations over one another until the serrations of the arresting member are safely lodged between the serrations of the toothed portion. Once the arresting member has its serrations safely lodged between the serrations of the toothed portion, the wedge members can rigidly connect the element to be arrested to the arresting member in any given position of the element, so that the latter is arrested in a selected one of the infinite number of positions along the guide rail.

In an especially simple currently preferred embodiment of the present invention, the biasing spring arrangement includes a biasing spring of the compression type which is accommodated in a depression of the arresting member, such a depression also accommodating for displacement a sleeve-shaped socket which has a transverse wall against which one end of the spring abuts, while the other end abuts against the bottom of the depression. In this manner, the spring presses the socket outwardly of the depression and into abutment with an abutment surface provided on the casing, whereas the reaction force presses the arresting member toward the toothed portion of the elongated rail. This embodiment of the spring arrangement of the present invention needs practically no maintenance and assures that the arresting member is always subjected to a force urging the same toward the toothed portion, which force acts in direction of the central axis of the arresting member.

In a further currently preferred embodiment of the invention, the wedge members are displaced between the various positions thereof by means of separate cylinder-and-piston units each of which can be individually controlled by admitting pressurized medium to one or the other side of the piston. The cylinder-and-piston units are so arranged that direction of movement of the movable member thereof is substantially normal to the guide rail, and the free end of the moveable member of the respective cylinder-and-piston unit is connected, in a rigid but dismountable manner, with a respective one of the wedge members. In this manner, it is assured that the wedge members can traverse, independently of one another, a stroke which may be different than the stroke of the other wedge member, until they reach their end positions in which their abutment surfaces contact and cooperate with the lateral surfaces of the arresting member. Thus, even when the arresting member is displaced out of its normal central position, due to the engagement of the serrations thereof with the serrations of the toothed portion, the wedge members will rigidly connect the element to be arrested to the arrested arresting member.

It is also proposed, according to a further concept of the present invention, to so construct the casing that it depends from the elongated guide rail, the latter being of a rectangular cross-section, at one side thereof, the toothed portion being arranged underneath the rectangular guide rail and facing downwardly. In this event, the casing is partially located below the toothed portion and the arresting member moves upwardly and downwardly into and out of contact with the toothed portion of the elongated guide rail.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIG. 1 is a partly cross-sectioned side-elevational view of the positioning arrangement of the present invention of which an arresting member in an off-center position;

FIG. 2 is a view similar to FIG. 1 with the arresting member in a central position;

FIG. 3 is a partially sectioned view taken generally on line III—III of FIG. 1;

FIG. 4 is a view similar to FIG. 1 but with the arresting member in disengaged position;

FIG. 5 is an end-elevational view diagrammatically illustrating the positioning arrangement of the present invention as used in a shearing machine; and FIG. 6 is a side elevational view of the shearing machine of FIG. 5.

DESCRIPTION OF THE PREFERRED EMBODIMENTS

Referring now to the drawing, and first to FIGS. 1 to 4 thereof, it may be seen that a substantially horizontally extending machine element 1 is suppoted on an elongated guide rail 2 which extends horizontally and is of a rectangular cross-section. The guide rail 2 has a marginal portion 2a, and an L-shaped portion 1a of the machine element 1 braces against the marginal portion 2a. One or a plurality of supports 3 supports the guide rail 2 from below. A casing 4 is connected to the machine element 1 and is located at a side of the guide rail 2 which is opposite to the marginal portion 2a, extending substantially downwardly from the machine element 1. The casing 4 includes a plate 5 which extends downwardly from the machine element 1, and a cross-tie 6 extends transversely of the plate 5 substantially in a horizontal plane. The cross-tie 6 is, therefore, substantially parallel to the guide rail 2 and extends from the plate 5 toward the support 3. A plate 7 extends from the cross-tie 6 upwardly, that is parallel to the plate 5 and in spacing therefrom. End plates 8 and 9 are connected to the plates 5 and 7 and/or to the cross-tie 6 and constitute therewith the rigid casing 4. The plates 6 and 7, end plates 8 and 9 and cross-tie 6 together bound an upwardly open hollow space 10, and an arresting member 11, as well as a pair of wedge members 12 and 13, are accommodated in the hollow space 10. The guide rail 2 has a toothed portion 14 which extends downwardly therefrom, the toothed portion 14 being in alignment with the hollow space 10 and thus with the arresting member 11 accommodated therein. The toothed portion 14 is arranged at a marginal portion 2b of the guide rail 2, is rigid with the guide rail 2, and extends longitudinally thereof. The toothed portion 14 is provided, at its lower portion, with a plurality of serrations 15, the serrations 15 extending substantially transversely of the elongation of the toothed portion 14.

The arresting member 11 has a portion 11b which faces toward the toothed portion 14, the portion 11b being provided with serrations 11a which correspond to the serrations 15 of the toothed portion 14. The largest dimension of the arresting member 11 in direction of elongation of the guide rail 2 is not only smaller than the corresponding dimension of the toothed portion 14, but also smaller than the spacing between the end walls 8 and 9 of the casing 4. The arresting member 11 has lateral portions 11c and 11d which diverge with respect to one another in direction toward the guide rail 2 and thus toward the toothed portion 14. The dimension of the arresting member 11 in direction normal to the guide rail 2 is substantially smaller than the spacing of the cross-tie 6 from the toothed portion 14. The arresting member 11 has, at its lower portion thereof, a pair of flanges 11f and 11g which extend parallel to the surface 11b of the arresting member, that is, substantially parallel to the guide rail 2 in mutually opposite lateral directions of the arresting member 11.

The arresting member 11 is provided with a depression 11h which is spaced from the guide rail 2 and which is coaxial with the arresting member 11. A sleeve-shaped socket 17 is accommodated in the depression 11h for movement axially of the arresting member 11, and a compression spring 16 extends between the abuts against the bottom of the depression 11h and a transverse wall of the sleeve-shaped socket 17. The transverse wall of the socket 17 abuts against an abutment surface formed on the cross-tie 6, being pressed against the same by the force exerted by the spring 16.

The wedge members 12 and 13 are guided at the end walls or plates 8 and 9 of the casing 4 for displacement in direction substantially normal to the guide rail 2, each respctive wedge member 12 or 13 having a respective wedge surface 12a or 13a which are adapted to contact and cooperate with the lateral surfaces 11c or 11d of the arresting member 11. Stationary members of cylinder-and-piston units, such as cylinders 20 and 21, are connected to the cross-tie 6, and movable members, such as piston rods 18 and 19 extend therefrom into the interior of the casing 4 in direction substantially normal to the guide rail 2. The wedge members 12 and 13 have threaded bores 12b and 13b, and the piston rods 18 and 19 have threaded end portions which threadingly engage the respective wedge members 12 and 13. A pressurized medium, such as pressurized air, can be supplied, in a non-illustrated conventional manner, to either one of the two sides of a respective non-illustrated piston which is accommodated in the respective cylinder 20 or 21. When the pressurized medium is admitted into the cylinders 20 and 21, respectively, the piston rods 18 and 19 move the wedge members 12 and 13 along the end walls or plates 8 and 9 toward and away from the guide rail 2. The piston rods 18 and 19 are spaced a certain distance from the flanges 11f and 11g of the arresting member 11 so that the latter can conduct a certain movement parallel to itself in a direction parallel to the elongation of the guide rail 2, as long as the serrations 11a and 15 are out of engagement with one another.

As particularly seen in FIG. 1, the arresting member 11 can assume an arresting position with respect to the toothed portion 14 in which the arresting member 11 is in an off-center position with respect to the piston rods 18 and 19 of the cylinder-and-piston units, which necessitates that the wedge members 12 and 13 are displaced toward the guide rail 2 to different extents before the wedge surfaces 12a and 13a thereof engage the lateral surfaces 11c and 11d of the arresting member 11. As a consequence of this relative movability of the arresting member 11 longitudinally of the toothed portion 14 and of the guide rail 2, the arresting member 11 can, during its movement toward its arresting position, move in the sense of reliable and positive engagement of the serrations 11a with the serrations 15. On the other hand, once the arresting member 11 is in the arresting position thereof, the possibility of the differential displacement of the wedge members 12 and 13 assures that the wedge surfaces 12a and 13a of the wedge members 12 and 13 can firmly engage the lateral surfaces 11c and 11d of the arresting member 11 regardless of the instantaneous position of the arresting member 11 with respect to the casing 4. In this manner, the wedge members 12 and 13 connect the casing 4 and thus the element 1 to the arresting member 11 when the latter is in a discrete arresting position thereof, without any relative shifting of the casing 4 with respect to the arresting member 11. Thus, while the arresting member 11 is arrested in a plurality of discrete positions along the toothed portion 14, the casing can be arrested in a number of different positions relative to the arresting member 11 which number is, for all intents and purposes, infinite. Of course, under certain circumstances, the arresting member 11 may assume a central position with respect to the casing 4, as illustrated in FIG. 2. In this event, of course, the extent of displacement of the wedge members 12 and 13 will be the same when the wedge members 12 and 13 reach the arresting positions thereof in which the wedge surfaces 12a and 13a abut against the lateral surfaces 11c and 11d of the arresting member 11 and the wedge members 12 and 13 abut against the end plates 8 and 9.

As may be further seen particularly in FIGS. 1 and 2, the flanges 11f and 11g of the arresting member 11 are spaced a certain distance from the wedge members 12 and 13, on the one hand, and from the cross-tie 6, on the other hand, when the arresting member 11 is in the arresting position thereof and the wedge surfaces 12a and 13a engage the lateral surfaces 11c and 11d of the arresting member 11. The flanges 11f and 11g project into the paths of movement of the wedge members 12 and 13 while the latter are retracted away from the guide rail 2 and also away from the toothed portion 14 so that, during such retraction, the wedge surfaces 12a and 13a first disengage from the lateral surfaces 11c and 11d of the arresting member 11. During this initial retraction, the helical compression spring 16 continues to urge the arresting member 11 into engagement with the toothed portion 14, until the wedge members 12 and 13 are retracted to such an extent that they abut against the flanges 11f and 11g. Following such abutment, the engagement of the wedge members 12 and 13 with the flanges 11f and 11g of the arresting member 11 results in displacement of the latter away from the toothed portion 14 so that the serrations 11a disengage from the serrations 15. This later retraction of the wedge members 12 and 13 results in compression of the compression spring 16 due to the displacement of the socket 17 into the depression 11h of the arresting member 11. The retraction of the wedge members 12 and 13 is continued until the flanges 11f and 11g abut against the cross-tie 6, which situation is illustrated in FIG. 4. In this manner, the flanges 11f and 11g simultaneously serve to limit the retracting motion of the wedge members 12 and 13. As seen in FIG. 4, in the fully retracted position the wedge surfaces 12a and 13a of the wedge members 12 and 13 are parallel to and spaced from the lateral surfaces 11c and 11d of the arresting member so that, when the wedge members 12 and 13 are displaced toward the retracting positions thereof, that is in direction toward the guide rail 2 and the toothed portion 14, as a result of charging the cylinders 20 and 21 with a pressurized medium, the action of the helical compression spring 16 initially presses the flanges 11f and 11g of the arresting member 11 against the wedge members 12 and 13, which pressing continues until the serrations 11a and the arresting member 11 come into contact with the serrations 15 of the toothed portion 14. At this point, the serrations 11a may find their proper positions with respect to the serrations 15 in that the slopes of the serrations 11a may slide along the slopes of the serrations 15. This sliding is made possible by the movability of the arresting member 11 longitudinally of the toothed portion 14. During such adjustment of the position of the arresting member 11 with respect to the toothed portion 14, the wedge members 12 and 13 continue their upward movement, until the wedge surfaces 12a and 13a, respectively, engage the lateral surfaces 11c and 11d of the arresting member 11. When the latter occurs, the casing 4 and thus the element 1 are rigidly and immovably connected to the arresting member 11 which, in turn, is arrested in its arresting position by the interengagement of the serrations 11a and 15.

While the positioning arrangement of the present invention can be used in a variety of applications, FIGS. 5 and 6 illustrate how such a positioning arrangement can be utilized in a shearing or cutting machine 25. It is to be understood that similar parts have been designated with similar reference numerals in all Figures. The movable and arrestable machine element 1, which has been discussed above in connection with FIGS. 1 to 4, is a portion of an abutment carriage 42 which is supported on the rectangular guide rail 2 for movement longitudinally thereof. In addition thereto, the carriage 42 is also supported on a rod 26 of circular cross-section by means of a slotted bearing 27. The bearing 27 is further formed with an internally threaded opening through which a threaded spindle 28 extends in engagement with the internal thread of the opening. The threaded spindle 28 extends parallel to the rod 26 and parallel to the guide rail 2, and an electromotor 29 is provided which rotates the spindle 28 in order to achieve displacement of the carriage 42 to the desired position. Once the carriage 42 has achieved its desired position, the operation of the electromotor 29 is discontinued so that the carriage 42 stops in this position. The forces which act on the carriage 42 during the arresting of the same in such a selected position are so minute as not to result in movement of the carriage 42 longitudinally of the rail 2, particularly due to the high mass and inertia of the carriage 42 and the components supported thereby, and due to the friction between the spindle 28 and the internal thread of the opening accommodating the same.

A pair of arms 30 and 31 extends downwardly from the carriage 42 in spaced relationship to one another, and a damped abutment arrangement 32, such as a pneumatically damped abutment arrangement, is supported on the arms 30 and 31 by means of an axle 33 for pivoting about the axis of the axle 33. The shearing machine 25 includes a pair of shearing blades 34 and 35, and the abutment arrangement 32 is located substantially at the same elevation as the shearing blades 34 and 35.

The rod 26 and the rectangular guide rail 2 are connected to a machine frame 36 which is supported on the floor by means of a base 37. A flywheel of a conventional construction is supported in usual manner at the machine frame 36, the flywheel not being illustrated inasmuch as it is covered by a protective cover 38. A drive motor 39 drives the flywheel, also in a conventional manner. The flywheel causes the movable one of the shearing or cutting blades 34 and 35 of the machine 25 to move, such blade 34 or 35 being supported in non-illustrated conventional support which is balanced by means of a pressurized air balancing cylinder arrangement 40, again in a conventional, non-illustrated manner. The movable parts of the machine 25 are also covered by a protective cover 41.

When employed in the shearing machine 25, the positioning arrangement determines the position of the abutment arrangement 32 relative to the shearing blades 34 and 35, thus determining the length of the blank which is severed off from the remainder of the profiled rod workpiece which passes between the blades 34 and 35 and the end portion of which abuts against the abutment arrangement 32 during the advancement of the workpiece.

It will be appreciated that such an exact and stepless arresting of the abutment carriage 42 is obtained with the positioning arrangement of the present invention, and with such a high arresting force, that the abutment carriage 42 can withstand the inertial forces which result from the movement of the workpieces which are to be subdivided into blanks and which abut against the abutment arrangement 32, without changing its position relative and longitudinally of the guide rail 2, so that such forces are securely transferred into the machine frame 37. In this manner, the deviation of the longitudinal dimension of the severed-off blank will correspond to that which has been preselected by positioning the carriage 42, within the permissible range of tolerances.

It will be understood that each of the elements described above, or two or more together, may also find a useful application in other types of constructions differing from the types described above.

While the invention has been illustrated and described as embodied in a positioning arrangement for use in a shearing machine, it is not intended to be limited to the details shown, since various modifications and structural changes may be made without departing in any way from the spirit of the present invention.

Without further analysis, the foregoing will so fully reveal the gist of the present invention that others can be applying current knowledge readily adapt it for various applications without omitting features that, from the standpoint of prior art, fairly constitute essential characteristics of the generic or specific aspects of this invention.

I claim:

1. A positioning arrangement comprising, in combination, elongated guide means extending in a first direction; an element mounted on said guide means for movement in said first direction between an infinite number of positions; means for moving said element into any selected one of said positions thereof; means for arresting said element in said selected position, including a toothed portion rigid with and extending longitudinally of said guide means, an arresting member having a detent portion juxtaposed with said toothed portion and mounted on said element for displacement relative thereto in a second direction toward and away from said toothed portion and also in said first direction, means for displacing said arresting member relative to said element at least in said second direction into a respective one of a plurality of discrete positions of said arresting member in which said detent portion fully engages at least one of the teeth of said toothed portion, and means for locking said element with said arresting member in said selected and respective positions thereof for preventing relative movement between said element and said arresting member which is retained in said respective position thereof by the engagement of said detent portion with said toothed portion and thus arrests said element locked thereto in said selected position thereof; and means for releasing said arresting means.

2. A combination as defined in claim 1, wherein said mounting means for said arresting member includes a hollow casing rigidly connected to said element, which is open toward said toothed portion and in which said arresting member is accommodated.

3. A combination as defined in claim 1, wherein said arresting member has a plurality of detent projections on said detent portion, said detent projections of said detent portion simultaneously engaging a multitude of teeth of said toothed portion.

4. A positioning arrangement comprising, in combination, elongated guide means; an element mounted on said guide means for movement in longitudinal direction thereof; and means for arresting said element in an infinite member of different positions along said guide means, including a toothed portion rigid with and extending longitudinally of said guide means, an arresting member having at least one detent projection extending toward said toothed portion and opposite lateral surfaces which diverge in direction normal to said toothed portion, means for mounting said arresting member on said element for displacement toward and away from said toothed portion so that said detent projection engages at least one selected tooth of said toothed portion thereby arresting said arresting member in a selected discrete position relative to said guide means, and disengages therefrom, respectively, and for movement relative to said element in the longitudinal direction of said guide means, said mounting means for said arresting member including a hollow casing rigidly connected to said element, which is open toward said toothed portion and in which said arresting member is accommodated, and means for so connecting said element with said arresting member, when the former is in a selected one of said different positions and the latter is in said selected discrete position, as to prevent any relative movement therebetween so that said arresting member arrests said element in said selected position thereof, including a pair of wedge members which have respective wedge surfaces adapted to contact said lateral surfaces along the latter, said wedge members being mounted in said casing for displacement toward and away from contact with said lateral surfaces.

5. A combination as defined in claim 4; and further comprising means for displacing said wedge members toward and away from contact with said lateral surfaces.

6. A combination as defined in claim 5, wherein said displacing means for said wedge members includes a pair of cylinder-and-piston units each having a stationary member connected to said casing and a movable member connected to the respective wedge member.

7. A combination as defined in claim 4, wherein said lateral surfaces diverge in direction toward said toothed portion; and wherein said wedge members are mounted for displacement toward and away from said toothed portion whereby said wedge surfaces contact said lateral surfaces during the displacement of said wedge members toward said toothed portion.

8. A combination as defined in claim 7, and further including means for urging said arresting member toward said toothed portion.

9. A combination as defined in claim 8, wherein said arresting member has laterally extending flanges which project into the paths of displacement of said wedge members and are spaced therefrom when said wedge members rigidly connect said casing to said arresting member so that said wedge members engage said flanges during the displacement thereof away from said toothed portion to thereby displace said arresting member against the action of said urging means out of engagement with said toothed portion.

10. A combination as defined in claim 8, wherein said arresting member is formed with at least one opening extending normal to said toothed portion and said casing has an abutment surface aligned with said opening, and wherein said arresting means includes at least one sleeve partially received in said opening for displacement with respect to said arresting member and projecting beyond said arresting member toward said abutment surface, and at least one compression spring in said sleeve abutting against said arresting member and urging said sleeve outwardly of said opening.

11. A combination as defined in claim 6, wherein said stationary member is a cylinder and said movable member is a piston and a piston rod; and wherein each respective wedge member is rigidly and dismountably connected to the respective piston rod.

12. A combination as defined in claim 4, wherein said guide means includes at least one elongated rail; wherein said casing is arranged underneath said rail; and wherein said toothed portion is arranged at the lower side of said rail.

13. A combination as defined in claim 12, wherein said rail is of a rectangular configuration.

* * * * *